United States Patent
Vaganov

(10) Patent No.: US 8,817,017 B2
(45) Date of Patent: Aug. 26, 2014

(54) 3D DIGITAL PAINTING

(76) Inventor: Vladimir Vaganov, Los Gatos, CA (US)

( * ) Notice: Subject to any disclaimer, the term of this patent is extended or adjusted under 35 U.S.C. 154(b) by 522 days.

(21) Appl. No.: 13/116,015

(22) Filed: May 26, 2011

(65) Prior Publication Data

US 2011/0292042 A1 Dec. 1, 2011

Related U.S. Application Data

(60) Provisional application No. 61/396,649, filed on Jun. 1, 2010.

(51) Int. Cl.
- *G06T 15/00* (2011.01)
- *G09G 5/02* (2006.01)
- *G09G 5/08* (2006.01)
- *G06F 3/01* (2006.01)

(52) U.S. Cl.
USPC .......................... 345/419; 345/619; 345/158

(58) Field of Classification Search
CPC .................... G06F 2203/013; G06F 3/016
See application file for complete search history.

(56) References Cited

U.S. PATENT DOCUMENTS

| | | | |
|---|---|---|---|
| 3,737,567 A | 6/1973 | Kratomi | |
| 4,021,846 A | 5/1977 | Roese | |
| 5,379,369 A | 1/1995 | Komma et al. | |
| 5,613,048 A | 3/1997 | Chen et al. | |
| 5,953,014 A | 9/1999 | Wood | |
| 6,850,210 B1 | 2/2005 | Lipton et al. | |
| 6,943,852 B2 | 9/2005 | Divelbiss et al. | |
| 7,126,598 B2 | 10/2006 | Oh et al. | |
| 2006/0061545 A1* | 3/2006 | Hughes et al. | 345/156 |
| 2008/0129899 A1* | 6/2008 | Sharp | 349/13 |
| 2011/0157155 A1* | 6/2011 | Turner et al. | 345/419 |

OTHER PUBLICATIONS

Ryan, Michael. "3D Sculpting Using Voxels with an exploration into interfaces." (2005).*
Dorsey, Julie, et al. "The mental canvas: A tool for conceptual architectural design and analysis." Computer Graphics and Applications, 2007. PG'07. 15th Pacific Conference on. IEEE, 2007.*
Olsen, Luke, et al. "Sketch-based modeling: A survey." Computers & Graphics 33.1 (2009): 85-103.*
Xin, Min, Ehud Sharlin, and Mario Costa Sousa. "Napkin sketch: handheld mixed reality 3D sketching." Proceedings of the 2008 ACM symposium on Virtual reality software and technology. ACM, 2008.*

(Continued)

*Primary Examiner* — Kee M Tung
*Assistant Examiner* — Zhengxi Liu
(74) *Attorney, Agent, or Firm* — Fitch, Even, Tabin & Flannery LLP

(57) ABSTRACT

The present invention provides method and system for 3D hand-painting and 3D hand-drawing. The system corresponding to the invented method comprises: an electronic monitor and computer, means for 3D digital vision, multi-axis input control device allowing digital painting or drawing on the canvas, additional input control device for virtual changing the position of the canvas between the painter and the monitor, means for 3D image presentation. The system and method provide painting or drawing on the electronic canvas for each of the virtual positions of the canvas by changing this position with the input control device and verifying it with the means for 3D digital vision. The system provides complete digital 2D images of the painting for the right and the left eyes, which are used for presentation of 3D painting by available means for 3D vision.

19 Claims, 15 Drawing Sheets

(56) References Cited

OTHER PUBLICATIONS

Adams, Bart, et al. "Interactive 3D painting on point-sampled objects." Proceedings of the First Eurographics conference on Point-Based Graphics. Eurographics Association, 2004.*

Gregory, Arthur D., Stephen A. Ehmann, and Ming C. Lin. "intouch: Interactive multiresolution modeling and 3d painting with a haptic interface." Virtual Reality, 2000. Proceedings. IEEE. IEEE, 2000.*

* cited by examiner providing a digital electronic canvas capable to presenting
two pictures for the right and left eye providing means for changing the virtual distance
between the canvas and the painter by digital changing
the horizontal shifting between the images
for the right and left eye on the canvas
corresponding to each virtual canvas position painting on the electronic canvas for each virtual
positions of the canvas providing simultaneous
appearance of a similar stroke on the right and left image
due to a high spatial and/or time resolution
between right and left image on the canvas

Fig. 1

3D DIGITAL PAINTING

CROSS-REFERENCE TO RELATED APPLICATIONS

This application is a Continuation to Provisional Patent Application No. 61/396,649, filed on Jun. 1, 2010, and which is incorporated herein by reference in its entirety and for all purposes.

FIELD OF THE INVENTION

This invention relates to digital painting and drawing, which allows create 3D images, which can be viewed and presented with different ways of stereo vision. It will create a new Art of 3D painting, be a powerful tool in education from the childhood to a university graduate education and further during the life, be a tool in science and engineering, in design of mechanical models and in chemical and biological research and alike. In general, this technology can be used for consumer, educational, professional, environmental and military and other applications.

BACKGROUND

The need in drawing, painting and writing exists as long as the human being himself and will exist as long as human being will exist. The graphical or painted in color image cannot be explained or interpreted by the other means, for example by voice, for inputting in the computer. That is why people are searching and will be always searching for newer technologies satisfying this need.

However, until now all painting art is 2D due to the 2D nature of all known canvases (more precisely surface related even it is not a plane but, for example, cylindrical or spherical surfaces). One of the challenges of painting always was how to create an image of the third dimension, the illusion of the depth of the picture. Although a number of great painters achieved fantastic results on this path, nevertheless the interest to 3D visual images, probably existed always, resulted in sculpture and architecture first. However painted sculptures didn't receive wide spread. Then realization of 3D or stereo vision with the advent of photography, when two photo-cameras, placed on a distance of about distance between the human eyes, made two pictures and then these pictures were viewed through the stereoscope invented in 1838.

The huge progress in stereo photography and stereo movie was achieved for the last 170 years. Latest achievements in 3D movies and 3D TV are making an interest to these technologies even greater because it becomes available on an individual level.

However, there were not many achievements on the front of 3D painting mostly because nothing changed in dimensionality of 2D canvas for painting.

There are several challenges for solving the problem of 3D free-hand painting and drawing. The first challenge is a 3D canvas for a free-hand painting and drawing on or within this canvas.

It is hard to imagine, from the existing technology viewpoint, the kind of media, which is true 3D (cube), transparent and allowing penetrating inside this cube with brush, making a stroke of paint and removing the brush without disturbing the rest of the media. It sounds like a science fiction, at least from the modern technology and known materials viewpoint. Otherwise it would bring us back to painted sculptures, which required to make the sculpture, first and then paint it.

As known, depth perception, as visual ability to perceive the world in three dimensions (3D), arises from a variety of depth cues. From all the depth cues both monocular and binocular stereopsis found the most practical applications. Stereopsis is the process in visual perception leading to the sensation of depth from the two slightly different projections of the world onto the retinas of the two eyes. The differences in the two retinal images are called horizontal disparity, retinal disparity, or binocular disparity. The differences arise from the eyes' different positions in the head.

These two images corresponding to different visions of the right and left eyes are relatively easy to create by stereo-photography or stereo-movie by taking two pictures simultaneously with two cameras separated horizontally similar to two separated eyes. However, it is hard to imagine how an artist can paint two paintings of the same image on two different canvases for two eyes such that they later could be viewed with one of the stereoscopic viewing system.

As long as art of painting exists almost all artists were trying to introduce their techniques of 3D illusion on the 2D flat picture proving the existence of a need for a 3D painting technique. Therefore, there is a need for creating a method and system for 3D painting.

SUMMARY

A method of digital recording of 3D hand-painted and 3D hand-drawn images is presented. The invented method comprises the steps of: providing an electronic canvas (computer monitor, TV screen, projection screen, display of the mobile device, etc.); providing means for 3D digital vision (shutter glasses, switching canvas between left and right eye, polaroid glasses, vertical cylinder lenses raster screens, etc.); providing at least one at least two-axis input control device allowing digital painting or drawing on the canvas; providing additional at least one at least one-axis input control device for virtual changing the position of the canvas along the axis between the painter and the canvas; painting or drawing on the electronic canvas for each of the virtual positions of the canvas in the third dimension by changing this position with the at least one at least one-axis input control device and verifying this position with the means for 3D digital vision; providing a description in digital format of images for right and left eyes on each virtual position of the canvas and of corresponding positions of the canvas; providing complete 2D images of the painting for the right and the left eyes; using left and right images for presentation of 3D painting by available means for 3D vision.

A corresponding system for digital recording of 3D hand-painted and 3D hand-drawn images is also presented. The invented system comprises: an electronic canvas (computer monitor, TV screen, projection screen, display of the mobile device, etc.); means for 3D digital vision (shutter glasses, switching canvas between left and right eye, etc.); at least one at least two-axis input control device allowing digital painting or drawing on the canvas; at least one at least one-axis input control device for virtual changing the position of the canvas along the axis between the painter and the canvas; means for 3D image presentation; wherein the system provides painting or drawing on the electronic canvas for each of the virtual positions of the canvas in the third dimension by changing this position with the at least one-axis input control device and verifying this position with the means for 3D digital vision; the system also provides a description in digital format of images for right and left eyes on each virtual position of the canvas and of corresponding positions of the canvas; the system also provides complete 2D images of the painting for the right and the left eyes; the system provides using left and right images for presentation of 3D painting by available means for 3D vision.

BRIEF DESCRIPTION OF DRAWINGS

FIG. 1 shows a core principle of the method of 3D digital painting.

DETAILED DESCRIPTION

Figure 2:
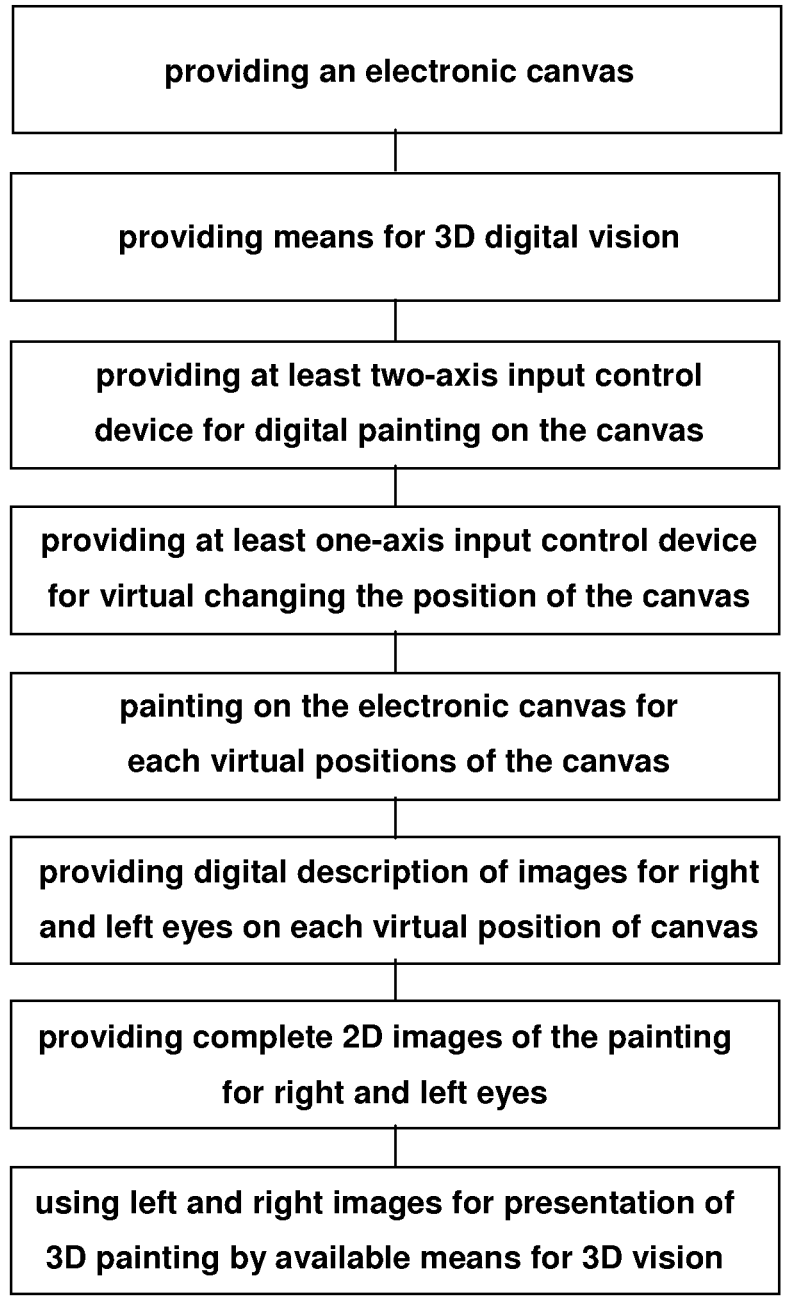
FIG. 2 shows an algorithm of the method for digital recording of 3D hand-painted and 3D hand-drawn images.

Specific embodiments of the invention will now be described in detail with reference to the accompanying figures.

In the following detailed description of embodiments of the invention, numerous specific details are set forth in order to provide a more thorough understanding of the invention. However, it will be apparent to the one of ordinary skill in the art that the invention may be practiced without these specific details. In other instances, well-known features have not been described in detail to avoid unnecessary complicating the description.

OBJECTS AND ADVANTAGES

An object of the present invention is to provide a method of 3-dimensional digital painting.

Another object of the present invention is to provide a method of 3-dimensional digital drawing.

Another object of the present invention is to provide a method of 3-dimensional digital handwriting.

Another object of the present invention is to provide a method of 3-dimensional digital navigation of the cursor on the monitor.

Another object of the present invention is to provide a method of 3-dimensional digital navigating of the objects in 3D computer and mobile gaming.

Another object of the present invention is to provide a method of 3-dimensional digital editing of the 3D photos (3D photoshop).

Another object of the present invention is to provide a method of converting 2-dimensional images into 3-dimensional images.

Another object of the present invention is to provide a method of digital recording of 3D hand-painted and 3D hand-drawn images.

Another object of the present invention is to provide a method of 3-dimensional digital painting, drawing, handwriting and navigating simultaneously by multiple participants, what creates a new platform for 3D communication, education, gaming, design, research and development and entertainment.

Another object of the present invention is to provide a system of 3-dimensional digital painting.

Another object of the present invention is to provide a system for 3-dimensional digital drawing.

Another object of the present invention is to provide a system for 3-dimensional digital handwriting.

Another object of the present invention is to provide system for of 3-dimensional digital navigation of the cursor on the monitor.

Another object of the present invention is to provide system for of 3-dimensional digital navigating of the objects in 3D computer and mobile gaming.

Another object of the present invention is to provide system for of 3-dimensional digital editing of the 3D photos (3D photoshop).

Another object of the present invention is to provide system for converting 2-dimensional images into 3-dimensional images.

Another object of the present invention is to provide system for digital recording of 3D hand-painted and 3D hand-drawn images.

Another object of the present invention is to provide system for of 3-dimensional digital painting, drawing, handwriting and navigating simultaneously by multiple participants, what creates a new platform for 3D communication, education, gaming, design, research and development and entertainment.

Another object of the present invention is to provide input control device for digital 3D hand-painting, 3D hand-drawing, handwriting and navigating objects on the monitor of the computer or electronic portable devices.

Another object of the present invention is to provide a universal tool, which can be used for multiple applications. It can be used as a painting or drawing tool, as a pen or pencil for writing, as a mouse or joystick for navigation on the screen or computer or mobile gaming, it can have a wireless capability and can be combined with cell-phone capabilities with all the attributes, which smart phone has: display, camera, microphone, speakerphone, control buttons, etc.

PREFERRED EMBODIMENTS

Principles of the method of digital 3D hand-painting and 3D hand-drawing illustrated in FIG. 1 and can be described as follows:

providing a digital electronic canvas capable to presenting two pictures for the right and left eye;

providing means for changing the virtual distance between the canvas and the painter by digital changing the horizontal shifting between the images for the right and left eye on the canvas corresponding to each virtual canvas position;

painting on the electronic canvas for each virtual positions of the canvas providing simultaneous appearance of a similar stroke on the right and left image due to a high spatial and/or time resolution between right and left image on the canvas.

Based on these principles a method of digital recording of 3D hand-painted and 3D hand-drawn images is illustrated in FIG. 2 and is represented by the following sequence of steps:

providing an electronic canvas (computer monitor, TV screen, projection screen, display of the mobile device, etc.);

providing means for 3D digital vision (shutter glasses, splitting canvas on two canvases and switching these canvases between left and right eye, etc.);

providing at least one at least two-axis input control device allowing digital painting or drawing on the canvas;

providing additional at least one at least one-axis input control device for virtual changing the position of the canvas along the axis between the painter and the canvas;

painting or drawing on the electronic canvas for each of the virtual positions of the canvas in the third dimension by changing this position with the at least one-axis input control device and verifying this position with the means for 3D digital vision;

providing a description in digital format of images for right and left eyes on each virtual position of the canvas and of corresponding positions of the canvas;

providing complete 2D images of the painting for the right and the left eyes;

using left and right images for presentation of 3D painting by available means for 3D vision.

Figure 3:
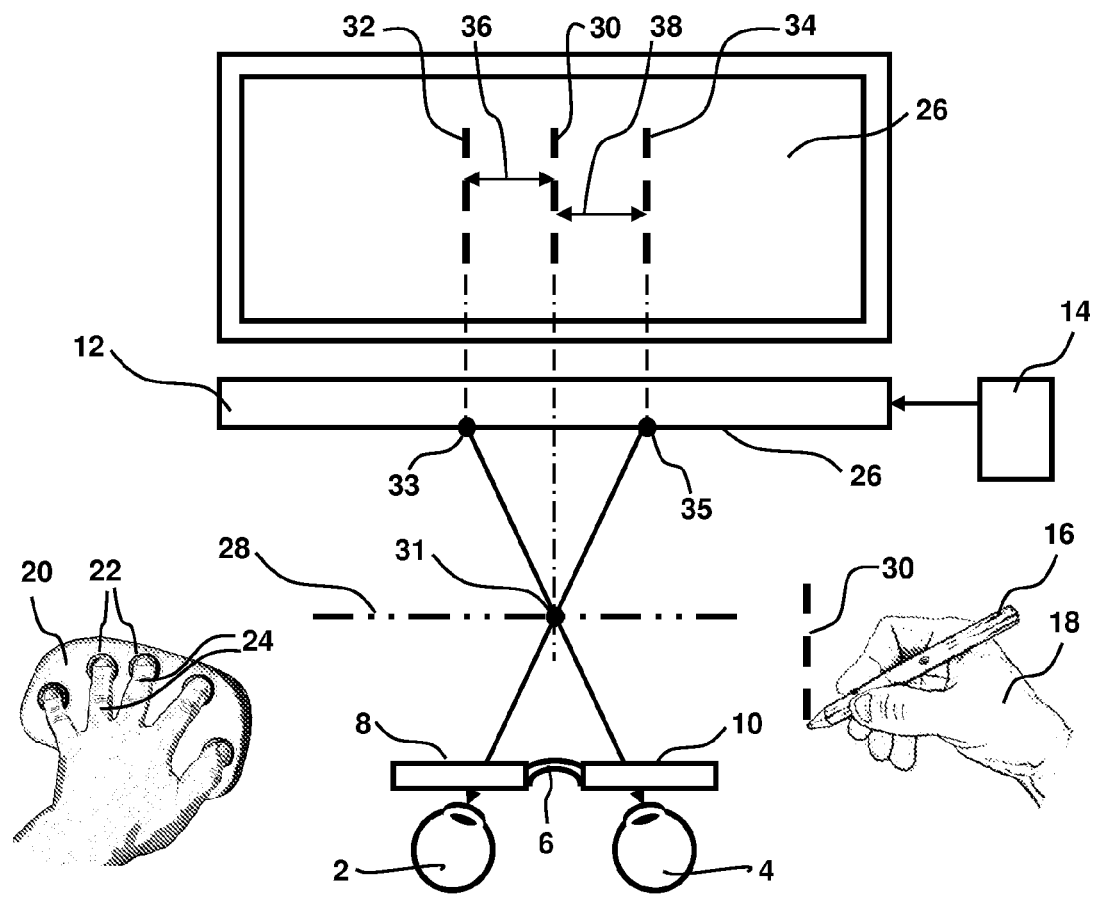
FIG. 3 shows a concept of 3D digital painting on a virtual canvas located between painter and digital monitor.

This method and corresponding system for realization of this method are illustrated in FIG. 3. The system comprises an electronic canvas 26 (computer monitor, TV screen, projection screen, display of the mobile device, etc.) controlled by computer 14. Means for 3D digital vision require two properties. First, it requires an ability of the screen 26 to represent two canvases for right and left eye. It can be done either by switching the screen between canvases for the right and the left eye or by making two striped canvases, which overlapped in a way when columns of pixels on the screen are located in turn belonging to two different canvases—right and left. The second property can be realized either by using shutter glasses 6 synchronized with the switching of the screen, or by using the raster of vertical miniature cylinder lenses on the front surface of the screen 26, or using the polarizing filter on the front surface of the screen, which would be capable to switch polarization of the screen light with some frequency between right and left canvas. In later case simple, light, low cost polarized glasses can be used without artifacts of shutter glasses.

The next key component of the system is a hand-held electronic pen or brush 16 allowing painting or drawing by hand 18 on the canvas 26. Obviously this brush/pen can be digital, wireless and provide many other functions useful for inputting information into digital processing systems. This tool should be at least two-axis input control device allowing digital painting or drawing on the canvas. However, increasing a number of axes gives many additional features. For example, using three-axis input control would allow to use it not only like a pen with constant width of the line but like a real brush, when a painter will be able to change the width of the line in the process of painting exactly how he is doing with the real brush. Moreover, additional controls on the tool might allow changing the color, transparency, structure of the stroke and many other characteristics of the painting process and resulting images.

Another important component of the system is an additional input control device for virtual changing the position of the canvas along the axis between the painter and the canvas. As shown in FIG. 3, it might be useful to have this device 20 controlled by the other than painting hand 18. Multiple control buttons/joysticks 22 can be used for different fingers 24 increasing the number of functions to be controlled. The control buttons/joysticks 22 can be one-axis, two axis or three-axis additionally increasing the number of controlled functions. If thumb and four fingers are used and each of the buttons/joysticks is a three-axis device then 15 control functions can be used simultaneously. For example, controlling functions of the digital painting process can be chosen from a group of: action, turning on and off, navigation of a cursor on the display of the electronic device, scrolling, zooming, shadowing, screening, selecting, deleting, restoring, saving, opening, closing, searching, setting up, previewing, undoing, clearing, repeating, pasting, finding, replacing, inserting, formatting, color selection, color mixing, line or stroke width, brush size, swatch size, sponge size, eraser size, the canvas virtual position, the depth of the focal plane around the canvas virtual position, special effects or combination.

This system provides painting or drawing on the electronic canvas for each of the virtual positions of the canvas in the third dimension by changing this position with the at least one-axis input control device and verifying this position with the means for 3D digital vision. The system also provides a description in digital format of images for right and left eyes on each virtual position of the canvas and of corresponding positions of the canvas The system also provides complete 2D images of the painting for the right and the left eyes by superposition of all layers corresponding to virtual positions of the canvas for the right and the left eye separately The system also provides complete 3D images of the painting by superposition of all layers corresponding to all virtual positions of the canvas. The system provides using left and right images for presentation of 3D painting by available means for 3D vision.

As soon as system will provide complete 2D images of the painting for the right and the left eye, any available system for stereoscopic imaging can be used for presentation of 3D paintings.

Figure 4:
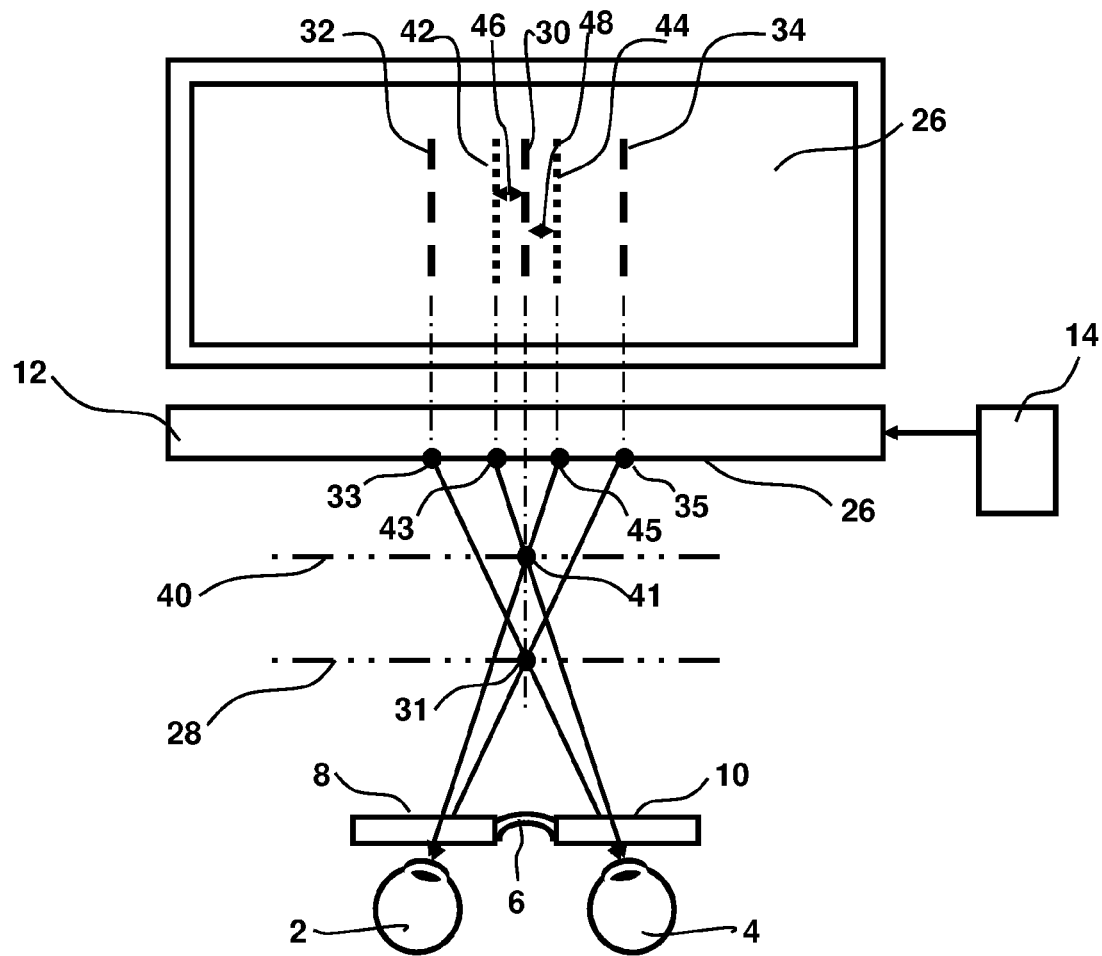
FIG. 4 illustrates how the offsets (horizontal shifts creating binocular disparity) of the virtual canvases for the right and left eyes depend on the position of the virtual canvas.

The method of 3D painting is also illustrated in FIG. 3. A painter is painting with an electronic brush 16, which he is moving by his hand 18 on any surface suitable for moving electronic brush along this surface. Let us suppose that a painter is painting a vertical line 30 and he wants to paint it in the virtual position of the canvas 28 in location 31 corresponding to a central line between the eyes 2 and 4. This virtual plane 28 is located between the screen 26 and the painter. It means that both eyes should be focused on the point 31 to see that line in the desired position. It means, in turn, that the image of this line for the right eye should be located on the screen 26 in the position 33 and the image of this line for the left eye should be located on the screen 26 in the position 35. Then the painter will be seeing the line 30 outstanding from the screen plane 26 to the virtual canvas plane 28 in the position 31. For achieving this effect the control device 22 should provide the shift of the line 30 image for the right eye on a distance 36 into location 32 (33). For the left eye similar shift should be 38 in opposite direction into position 34 (35). By the other words, the virtual position of the canvas is determined by the corresponding shifts of the right and left images in the opposite directions with respect to the central line on the screen, as illustrated in FIG. 4. It creates binocular disparity and visual sensation of depth.

Changing the shifts of the images for the right eye from 32 to 42 and for the left eye from 34 to 44 the virtual canvas position will change from plane 28 to plane 40, as it is clear from FIG. 4.

Figure 5:
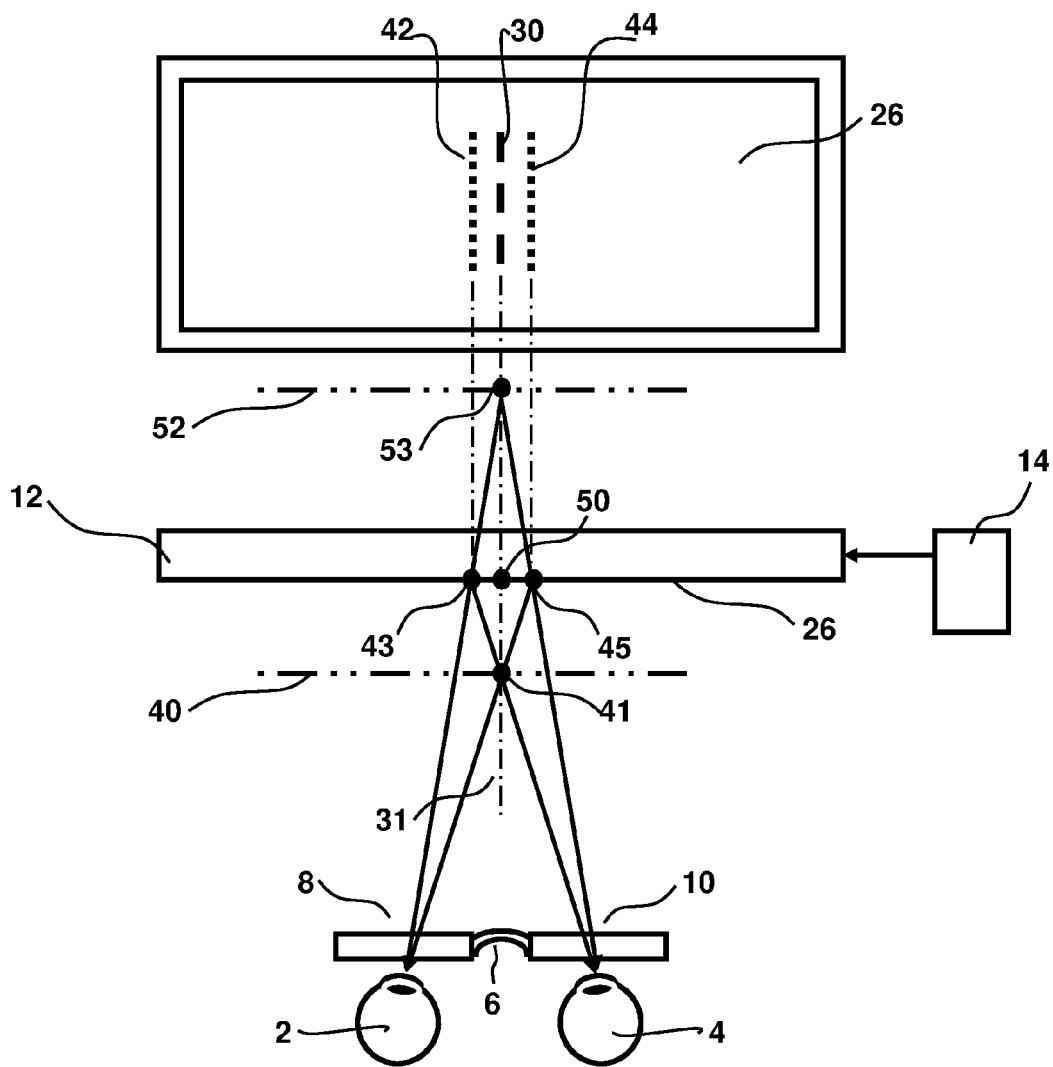
FIG. 5 illustrates how the offsets (horizontal shifts) of the virtual canvases for the right and left eyes change sign, when virtual canvas changes position from in front of the plane of a display to behind the plane of a display.

FIG. 5 illustrates how the virtual position of the canvas could be located either if front of the screen or behind the plane of the screen. If the line 42 (43) on the screen 26 is allocated to the virtual screen for the right eye 4 and the line 44 (45) on the screen 26 is allocated to the virtual screen for the left eye 2, then the location of the virtual screen corresponds to plane 40. The image of the line 30 (50) will be located in the position 41 on the virtual plane 40, which is located between the screen 26 and the painter—within outstanding from the screen position of the virtual canvas.

Let us now change the allocations of the images 43 and 45 on the screen 26 between the right and left eyes. If the line 42 (43) on the screen 26 is allocated to the virtual screen for the left eye 2 and the line 44 (45) on the screen 26 is allocated to the virtual screen for the right eye 4, then the location of the virtual screen corresponds to plane 52. The image of the line 30 (50) will be located in the position 53 on the virtual plane 52, which is positioned behind the screen 26.

It is clear that when the image of the line 30 supposed to be located on the screen plane in the position 50, then there is no difference between the images for the right and the left eye, i.e. there is no shift between the images for the right and the left eye with respect to the center line 31 between the right and the left eye.

Figure 6:
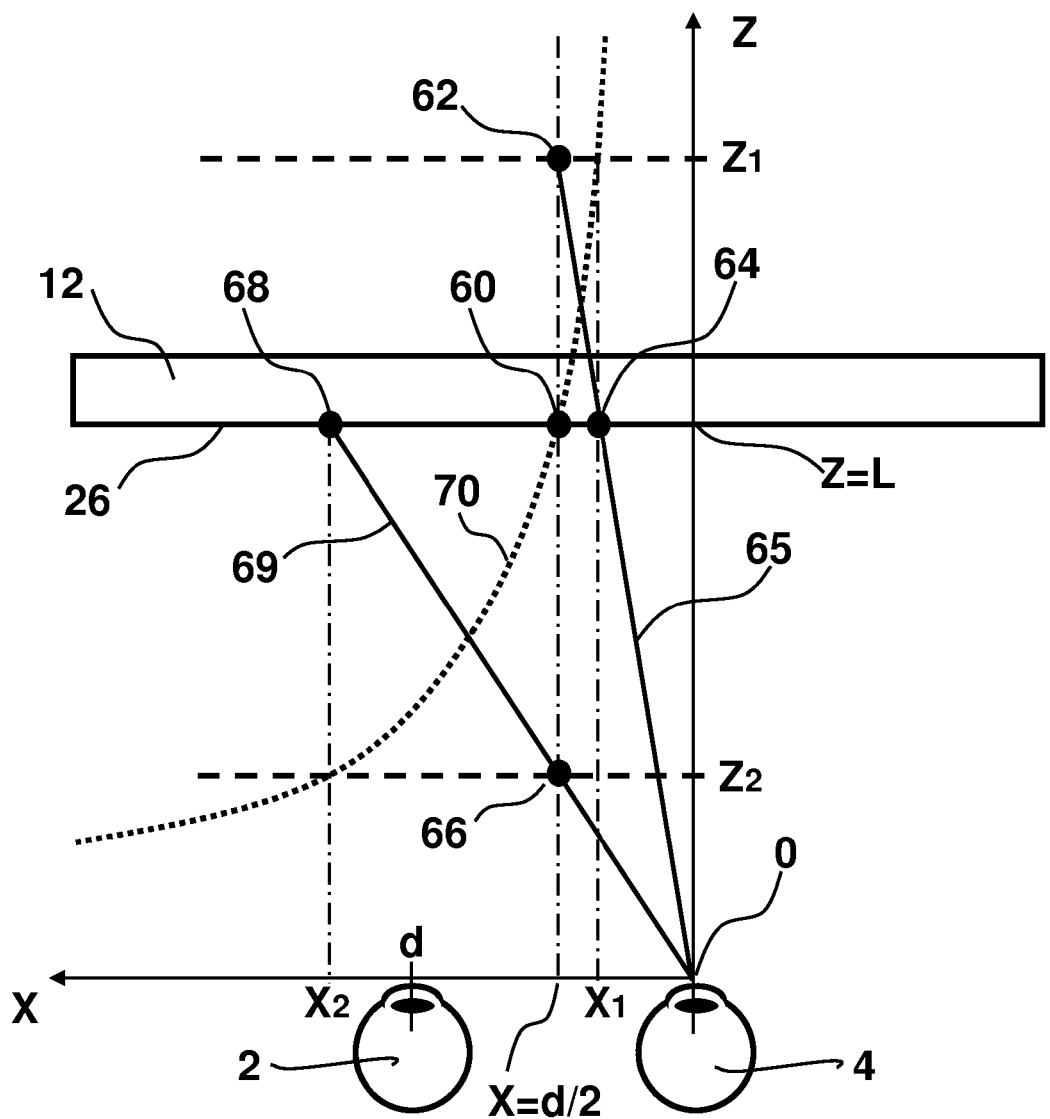
FIG. 6 illustrates the offset (horizontal shift) of the virtual canvas for the right eye as a function of the virtual canvas position.
Figure 7:
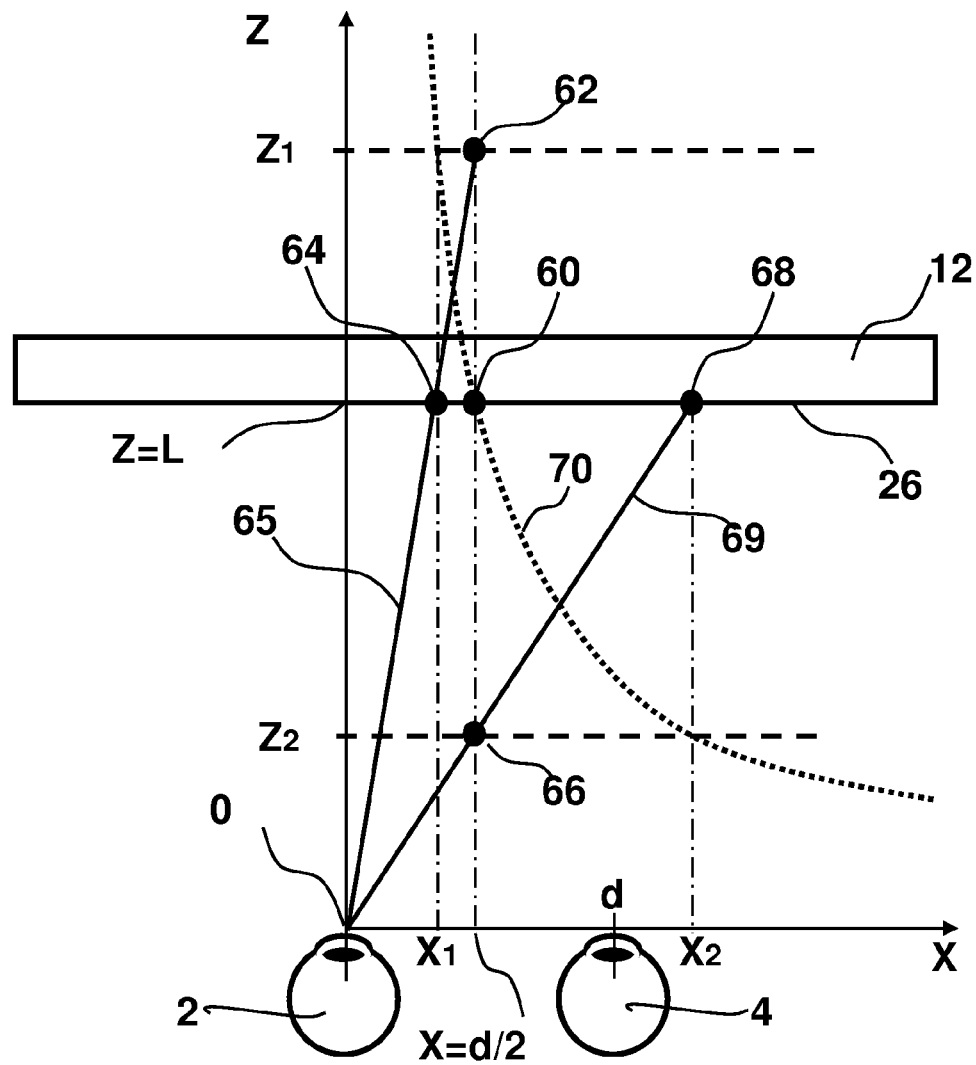
FIG. 7 illustrates the offset (horizontal shift) of the virtual canvas for the left eye as a function of the virtual canvas position.

FIG. 6 illustrates the function 70 between the desired location of the virtual canvas plane Z1 or Z2 and the image 64 or 68 correspondingly on the screen 26 for the right eye 4. Similarly FIG. 7 illustrates the same for the left eye. This function can be expressed as:

$$Z=Ld/2x,$$

where
- Z—location of the virtual canvas;
- L—distance between painter and monitor;
- d—distance between eyes;
- x—location of the image on the screen.

Therefore, in order to move the virtual canvas into a coordinate Z on the axis Z, which originates in the painter eye and perpendicular to the screen, the control of this function should provide a horizontal shift x of the virtual canvas for this eye relative to the point on the screen where axis Z crosses the screen. This shift should be directed toward the other eye. As a result, two virtual canvases will exist in the painter's field of vision and due to their mutual shift in opposite directions the painter will see one virtual screen located either in front or behind the plane of the screen in the coordinate Z. This required shift x can be determined as:

$$x=Ld/2Z,$$

Figure 8:
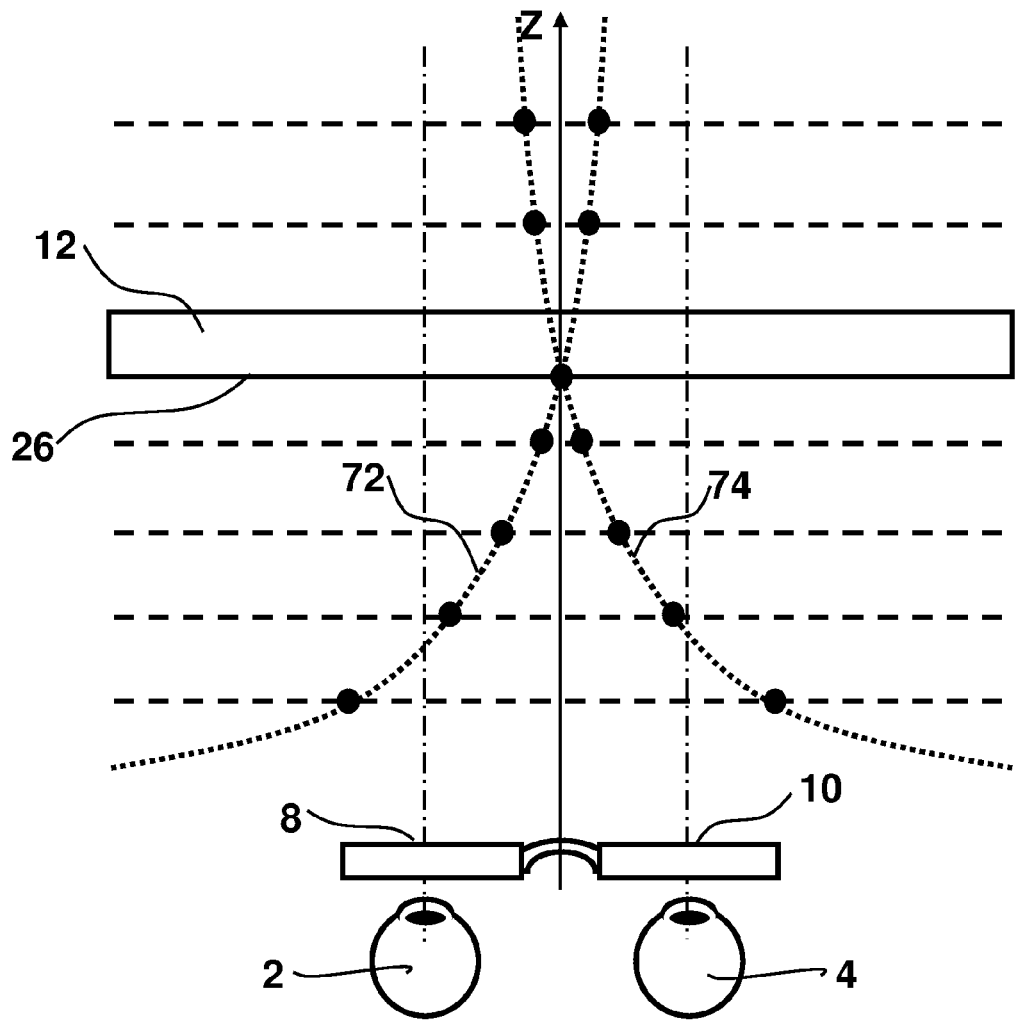
FIG. 8 illustrates how the central vertical lines of the canvases for the right and left eyes change (offset) in opposite directions depending on the virtual position of the canvas.

FIG. 8 combines FIGS. 6 and 7 presenting both functions 72 and 74 for right and left eye correspondingly.

The challenge with determining the position of the initial canvas is that it is blank and the right and left eye cannot see the difference in their images. Similar situation will exist at the beginning stage of painting, when there are not too many images or the strokes of the electronic brush already exist on the canvas. Even at the later stages of painting or in case of editing 3D pictures (3D photoshop) it would be very helpful to have temporary grid or system of lines, which would give a painter or observer the visual representation of the current position of the virtual canvas.

In the simplest case the virtual position of the canvas is presented by at least one virtual Z-axis having an origin somewhere in the plane parallel to the screen. It might be located at the location of a painter and directed from the painter plane toward the screen. It has a scale describing a distance from the painter to the virtual position of the canvas and this current virtual position of the canvas is indicated on the scale.

The origin of the virtual Z-axis can be located somewhere in the horizon line and indicate the position of the virtual canvas on the scale of the axis. In general one virtual Z-axis is presented on the screen as a line with the scale connecting some point on the periphery of the screen with some inner point within the screen. The pitch of the scale might be non-linear reflecting the changing distance of the object from the painter.

In more general case virtual Z-axis can be presented by the line chosen from: strait line, curved line, periodic line, spiral line, vertical line, horizontal line, descending line, ascending line and combination.

Figure 9:
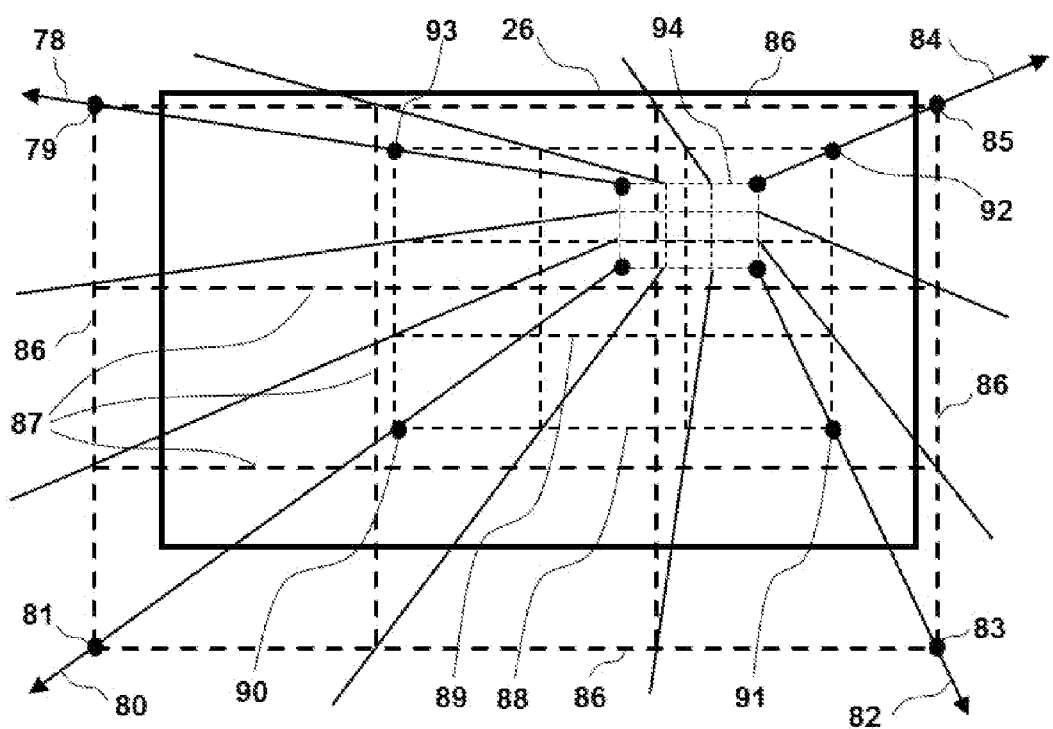
FIG. 9 illustrates virtual Z-axes and temporary grid indicating the position of virtual canvas.

It is more convenient to have several Z-axes, as shown in FIG. 9. In this case it is possible to show: the position of the virtual canvas; scaling of the similar objects depending on the position of the virtual canvas; either virtual infinite point—origin of all Z-axes or the most distant virtual position of the canvas, both of which can be selected by the painter. Four major Z-axes 78, 80, 82 and 84 along with several additional Z-axes define a 3D grid, as show in FIG. 9. Corresponding points on the major Z-axes are connected by lines 86, 88, 94 creating a visual representation of the plane, which can correspond to a current position of the virtual canvas. The temporary grid visually defining the virtual position of the canvas is a system of lines including lines connecting points on different virtual Z-axes corresponding to the same position of the virtual canvas.

These rectangles 86, 88 and 94 can have additional inner lines 87, 89, which further provide scaling of 2D images on each virtual position of the canvas. This 2D scaling can be provided automatically while position of canvas is changing. The function of 2D scaling of the canvas position can be chosen beforehand and it will determine the depth of the painting. The depth of the painting in Z dimension can be controlled depending on requirements to a 3D painting. The Z-axes are perceived by the painter as lines going in Z direction from the painter toward some point behind the screen or in opposite direction because they are presented on both canvases for right and left eyes. Therefore, the entire grid is seen as a three-dimensional structure, within which the painting is happening.

There is a number of options exists with choosing the location and position of the axes, their scales, and, as a result, virtual positions of the canvas. For example, at least one virtual Z-axis can have an angle relative to the perpendicular to the canvas in the range of 0 to 90 degrees. The scale on the at least one virtual Z-axis can be chosen as linear, exponential, logarithmic, sine, or any other function. The scale on different virtual Z-axes can be different reflecting the different angular position of the virtual canvas with respect to different virtual Z-axes.

Figure 10:
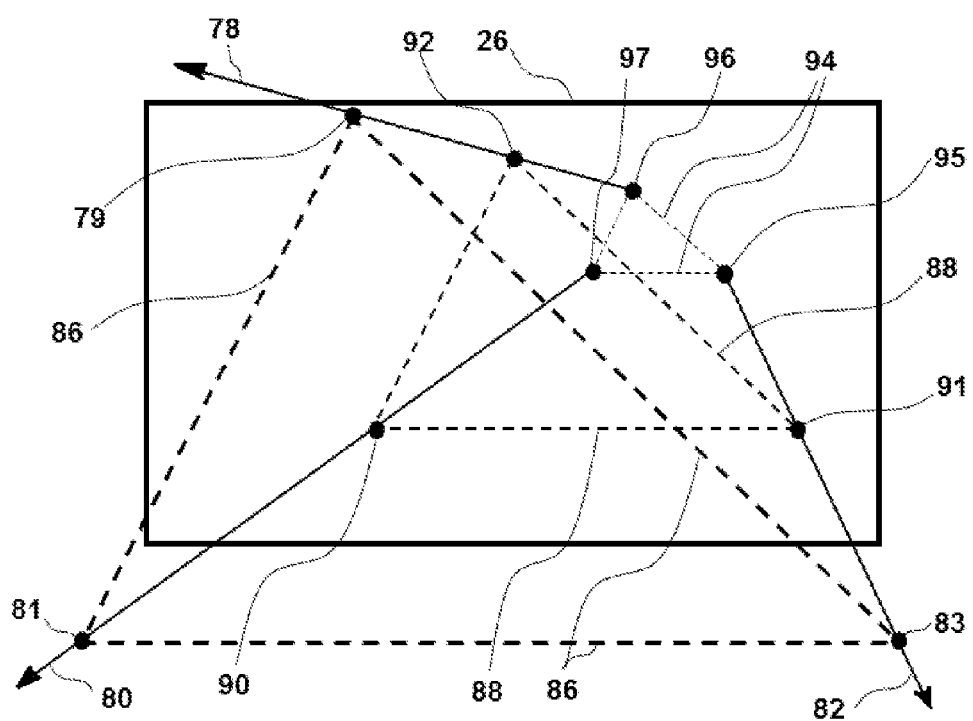
FIG. 10 illustrates a case of only three virtual Z-axes and temporary triangle grid indicating the position of virtual canvas.

The number of Z-axes can be different. FIG. 10 illustrates the case of three Z-axes and corresponding triangle pyramidal 3D grid for controlling the position of virtual canvas.

Angular direction of the X and Y axes on the canvas can change for different virtual positions of the canvas or for different points of the at least one virtual Z-axis. It would reflect the possibility of creating a distorted 3D virtual space, which can predetermine the desired distortion of the images within this space independently on the sequence of creating/painting those images.

The total 3D scaling grid, although is temporary and does not interfere with the painting, might be helpful during the entire process of painting and can be turned on and off any time. There are many different ways of visualization of selected virtual position of the canvas. For example, the selected position of the virtual canvas can be presented as a focal plane with the small depth of sharpness. It means that the images within this plane will be sharp while the images on the other planes in front and behind the selected plane will be presented as blurred. The depth of sharpness might be set up beforehand or controlled continuously in the process of painting by one of the control buttons/joysticks 22, as shown in FIG. 3.

In another example of the visualization of selected position of the virtual canvas this position can be presented as a semi-transparent plane, which is crossed by the Z-axes. The part of Z-axes between the plane and the painter will be seen sharp while the other part, being behind the semi-transparent plane, will be seen blurry. Therefore, the position of the virtual canvas will be visually defined on the system of Z-axes.

The method of digital 3D hand-painting and 3D hand-drawing and method of digital recording of painted images described above can also possess the following properties:

- providing a description in digital format of images on each virtual position of the canvas and of corresponding positions of the canvas and providing complete 3D digital image of the painting for different applications associated with 3d image processing (like rotation, animation, etc.);
- painting or drawing on the electronic canvas for each of the virtual positions of the canvas in the third dimension will result in simultaneous painting on two canvases switching between right and left eye with frequency high enough that hand-painted images would appear on both canvases with certain horizontal offsets with respect to a central vertical line for each canvas on a distance corresponding to chosen virtual position of the canvas;
- providing a complete 2D images of the painting for the right and the left eyes obtained by superposition of all layers corresponding to virtual positions of the canvas for the right and the left eye separately;
- providing multiple virtual positions of electronic canvas along the axis between the painter and the canvas;
- providing a property of electronic canvas to be transparent outside the painted area on the current virtual position of the canvas for all images on the next positions of the canvas located further from the painter;
- providing a property of electronic canvas to mask by the painted area on the current virtual position of the canvas the images on the next positions of the canvas located further from the painter;
- providing such a property of electronic canvas, wherein the opacity and transparency of the painted areas are controlled independently for any layer corresponding to a virtual position of electronic canvas;
- providing a property of electronic canvas to be switched in turn for left and right eye with a certain frequency high enough that drawn lines and painted strokes are continuous for both right and left images;
- providing the means for 3D digital vision, which comprise the electronic canvas capable switching in turn for left and right eye with a certain frequency and shutter glasses switching synchronously with electronic canvas between left and right eye;
- providing two or more at least two-axis input control devices allowing simultaneous digital painting or drawing on the canvas;
- providing two or more at least two-axis input control devices allowing simultaneous digital painting or drawing on different virtual positions of the canvas;
- switching electronic canvas between two or more at least two-axis input control devices, their corresponding additional at least one-axis input control devices and corresponding shutter glasses, which are switching synchronously with electronic canvas between these input control devices and for each input control device between left and right eye;
- providing additional two or more at least one-axis input control devices, which are used for controlling functions of the digital painting process chosen from a group of: action, turning on and off, navigation of a cursor on the display of the electronic device, scrolling, zooming, shadowing, screening, selecting, deleting, restoring, saving, opening, closing, searching, setting up, previewing, undoing, clearing, repeating, pasting, finding, replacing, inserting, formatting, color selection, color mixing, line or stroke width, brush size, swatch size, sponge size, eraser size, special effects . . . or combination;
- providing painting or drawing on the electronic canvas, which is happening simultaneously with changing the virtual positions of the canvas in the third dimension by changing this position with the at least one-axis input control device and verifying this position with the means for 3D digital vision;
- providing an additional input control determining the range of variations of the canvas virtual positions within the system of 3D digital vision;
- providing an additional input control determining the depth of the focal plane around the canvas virtual position within the system of 3D digital vision;
- providing presentation of the virtual position of the canvas as a focal plane with a small focal depth for the purpose of increasing accuracy of verification of virtual canvas position;
- providing presentation of the virtual position of the canvas as a temporary grid corresponding to this virtual position of the canvas;
- providing a grid in the plane of the canvas corresponding to the virtual position of the canvas within the system of 3D digital vision, which has the pitch of the grid proportional to the distance from the painter to the virtual position of the canvas;
- providing grid in the plane of the canvas, wherein pitch of the grid is proportional to the distance from the painter to the virtual position of the canvas and changing the virtual position of the canvas automatically changes the grid pitch;
- providing such a way of presentation of the virtual position of the canvas, where it is presented by at least one virtual Z-axis having an origin somewhere in the plane parallel to the canvas and located at the location of a painter, this at least one virtual Z-axis is directed from the painter plane toward the canvas and having a scale describing a distance from the painter to the virtual position of the canvas and this virtual position of the canvas is indicated on this scale;

providing at least one virtual Z-axis, which is presented on the canvas as a line with the scale connecting some point on the periphery of the canvas with some inner point within the canvas;

providing at least one virtual Z-axis, which is presented by the line chosen from: strait line, curved line, periodic line, spiral line, vertical line, horizontal line, descending line, ascending line and combination;

providing such angular direction of the X and Y axes on the canvas, which can change for different virtual positions of the canvas or for different points of the at least one virtual Z-axis;

providing at least one virtual Z-axis, which can have an angle relative to the perpendicular to the canvas in the range of 0 to 90 degrees;

providing a scale on the at least one virtual Z-axis, which is chosen from: linear, exponential, logarithmic, sine, or any other function;

providing two virtual Z-axes having an origin somewhere in the plane parallel to the canvas and located at the location of a painter, these two virtual Z-axes are directed from the painter plane toward the canvas and having scales describing a distance from the painter to the virtual position of the canvas and this virtual position of the canvas is indicated on these scales;

providing three virtual Z-axes having an origin somewhere in the plane parallel to the canvas and located at the location of a painter, these three virtual Z-axes are directed from the painter plane toward the canvas and having scales describing a distance from the painter to the virtual position of the canvas and this virtual position of the canvas is indicated on these scales;

providing four virtual Z-axes having an origin somewhere in the plane parallel to the canvas and located at the location of a painter, these four virtual Z-axes are directed from the painter plane toward the canvas and having scales describing a distance from the painter to the virtual position of the canvas and this virtual position of the canvas is indicated on these scales;

providing scales on different virtual Z-axes, which can be different reflecting the different angular position of the virtual canvas with respect to different virtual Z-axes;

providing a temporary grid visually defining the virtual position of the canvas, which is a system of lines including lines connecting points on different virtual Z-axes corresponding to the same position of the virtual canvas;

providing means for presentation of 3D images, which are chosen from a group of: optical projection of two images with polarized light onto one screen and using polarized glasses, optical projection of two images with colored light onto one screen and using corresponding colored glasses, stereoscopic glasses and two photographs or slides, 3D digital personal viewer, shutter glasses and synchronous switching display between left and right eye, direct projection of left and right images onto retina of the eyes.

associating each virtual position of the canvas with the corresponding zooming value of the image, which can be setup in different required range in such a way that equal size of an object on different virtual positions of the canvas would be zoomed out while virtual positions of the canvas will be moving from the painter and would be zoomed in while virtual positions of the canvas will be moving toward the painter;

associating a painted stroke or image with certain virtual position of the canvas and later moving it to a different virtual position of the canvas, either with zooming or without zooming, and pasted on this new position of the canvas;

associating a painted 3D image with certain range of virtual positions of the canvas and later moving it to a different range of virtual positions of the canvas, either with corresponding zooming or without zooming, and pasting on these new positions of the canvas.

The system for digital 3D hand-painting and 3D hand-drawing and system for digital recording of painted images described above can also comprise the following elements:

an electronic canvas, which is chosen from the group: computer monitor, TV screen, projection screen, display of the mobile device or any other graphical computer output device;

at least two-axis input control device allowing digital painting or drawing on the canvas, which is chosen from the group: sensitive pad, mouse, track ball, joystick, finger joystick, thimble, key-button, touch pad, touch screen, 6D motion sensor, smart pen, universal tool described below;

at least two-axis input control device allowing digital painting or drawing on the canvas, which is a three-axis input control device;

a three-axis input control device allowing digital painting or drawing on the canvas, which is a universal tool described below;

an additional at least one at least one-axis input control device for virtual changing the position of the canvas along the axis between the painter and the canvas, which is chosen from a group of: scroll wheel, sensitive pad, mouse, track ball, joystick, finger joystick, thimble, key-button, touch pad, touch screen, 6D motion sensor, smart pen, universal tool described below, and alike;

an additional at least one at least one-axis input control device for virtual changing the position of the canvas along the axis between the painter and the canvas, which can be either two-axis or three-axis input control device;

an additional at least one at least one-axis input control device for virtual changing the position of the canvas is integrated within one device with at least one of at least two-axis input control devices allowing digital painting or drawing on the canvas;

an additional input control determining the range of variations of the canvas virtual positions;

an additional input control determining the depth of the focal plane around the canvas virtual position;

means for presentation of 3D images, which are chosen from a group of: optical projection of two images with polarized light onto one screen and using polarized glasses, optical projection of two images with colored light onto one screen and using corresponding colored glasses, stereoscopic glasses and two photographs or slides, 3D digital personal viewer, shutter glasses and synchronous switching display between left and right eye, direct projection of left and right images onto retina of the eyes;

3D digital personal viewer, which comprises: two micro-displays for left and right eye, two lenses of the glasses for projecting the images from the displays into eyes, processor, memory, power supply, transceiver, body of the viewer integrating all the elements of the device.

Figure 11:
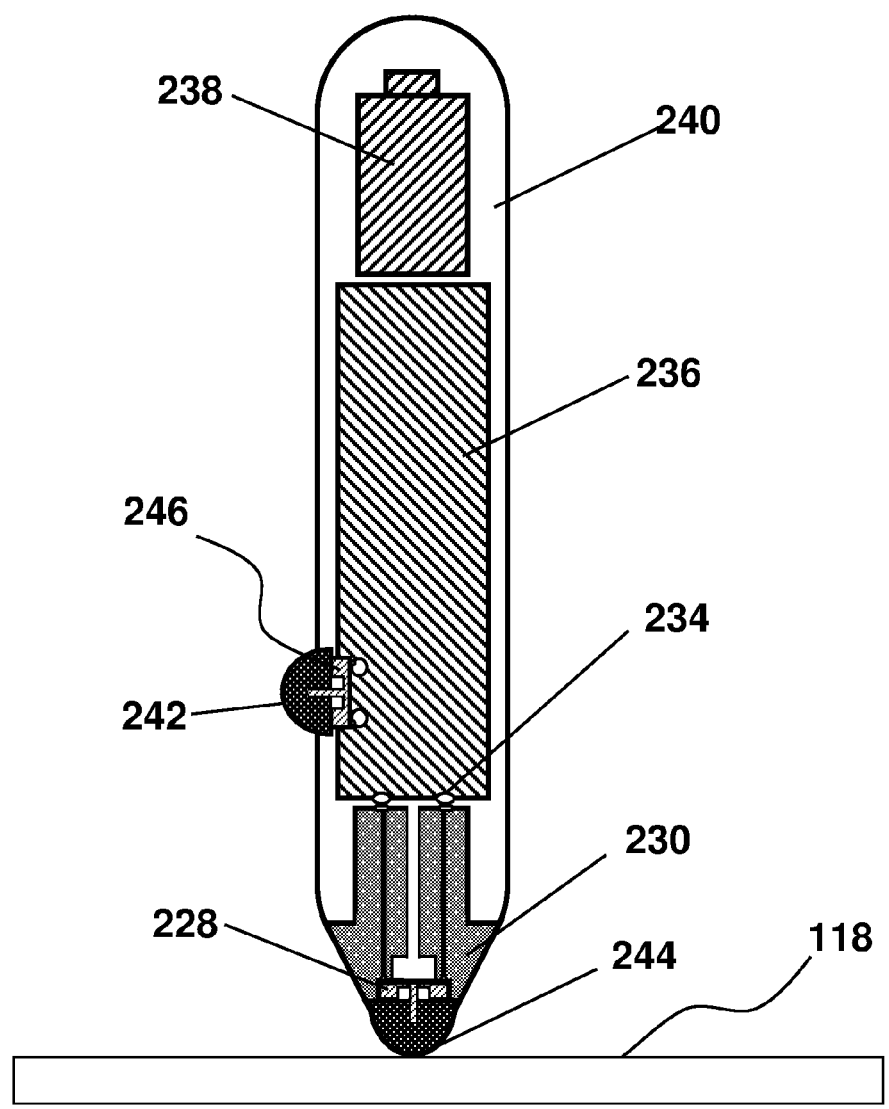
FIG. 11 shows a concept of an end-point digital brush and its major components.

FIG. 11 illustrates am example of input control device allowing digital painting or drawing on the canvas. This device comprises several components. An end-point 244 is coupled to an integrated at least one at least two-axis force sensor 228 within the device; IC circuit for digitizing the information from at least one at least two-axis force sensor and processing the data related to the change of the force vector components. This circuit can be integrated on the same chip 228 with force sensor. It also can be located within the block 236 in the main body 240 of the device. The same block 236 can comprise hardware and software for providing a description in digital format of how the device has been pressed to the surface based at least in part on the force applied by the end-point to the writing surface. It also can comprise hardware and software for providing a description in digital format of how the device has been moved over the surface based at least in part on the correlation between the force vector components and corresponding movement vector components. End point 244 with force sensor 228 can be integrated within an interchangeable head 230, which is electrically connected by contacts 234 with the main processing block 236. The head 230 is the most delicate part of the device, as it has a direct mechanical contact with the painting surface and therefore, tear and ware of the end point would require periodic change. Making the head 230 interchangeable and having low cost and leaving the most expensive component within the main body 240 of the device allow reducing the total cost of ownership of this device. Block 236 can also comprise wireless communication circuits. Power supply 238 is also located in the device body 240. One or more additional control buttons 242 with their sensors 246 can be integrated in the device.

The device is moving with a hand and/or fingers such that the end-point 244 is contacting a surface 118 suitable for such movement across the surface in a process of painting, drawing, writing or cursor navigating while recording with the integrated at least one at least two-axis force sensor the change of the vector force representing the motion of the device and force applied to the sensor by the end-point.

The painting device can further comprise at least one sensor chosen from the group of sensors consisting of: one-axis linear accelerometer, two-axis linear accelerometer, three-axis linear accelerometer, one-axis gyro, two-axis gyro, three-axis gyro, one-axis angular accelerometer, two-axis angular accelerometer, three-axis angular accelerometer, one-axis compass, two-axis compass, three-axis compass for determining the motion parameters, at which the device has been moved between recording of two positions on the working surface.

The end-point 244 can be chosen from the group: a pin [tip] coupled to the at least one at least one-axis force sensor, a ball contacting with the at least at least two-axis force sensor, a bunch of fibers coupled to the at least one at least two-axis force sensor.

Figure 12:
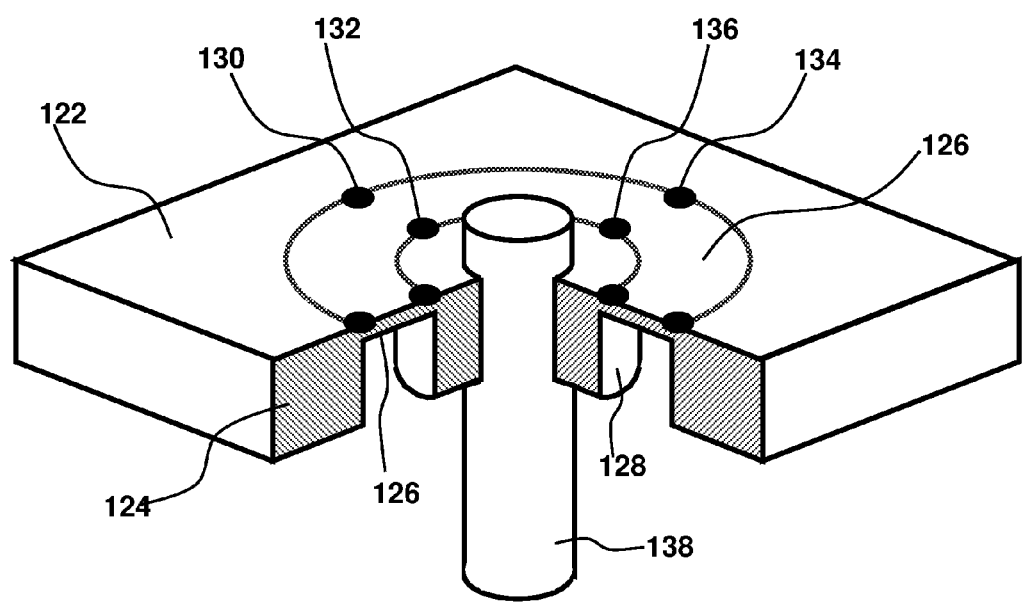
FIG. 12 shows a 3D force sensor, which can be used in end-point digital brush.

FIG. 12 illustrates an example of a force sensor, which can be coupled to an end point of the painting device. It comprises a semiconductor substrate sensor chip 122, which, in its turn, comprises a frame element 124, a rigid island element 128 and an elastic element 126 mechanically coupling said frame and said rigid island elements 128. A set of two or more stress-sensitive IC components 130, 132, 134, 136 are integrated into the elastic element 126. At least one force-transferring element 138 couples the end-point 244 to a rigid island element 128 of a sensor die 122 for transferring the applied external vector force from the end-point through the force-transferring element 138 to the rigid island element 128 of the sensor die 122, and thereby generating electrical outputs from application the external force vector via stress-sensitive IC components 130-136 positioned in the elastic element 126 each carrying the unique orthogonal system component of signal from the force vector, where the IC component outputs are functions of input component stresses developed from the orthogonal system force components.

In general, at least two-axis force sensor is chosen from a group: mechanical force sensor, linear acceleration force sensor, angular acceleration force sensor, Coriolis force or angular rate force sensor and combination.

Figure 13:
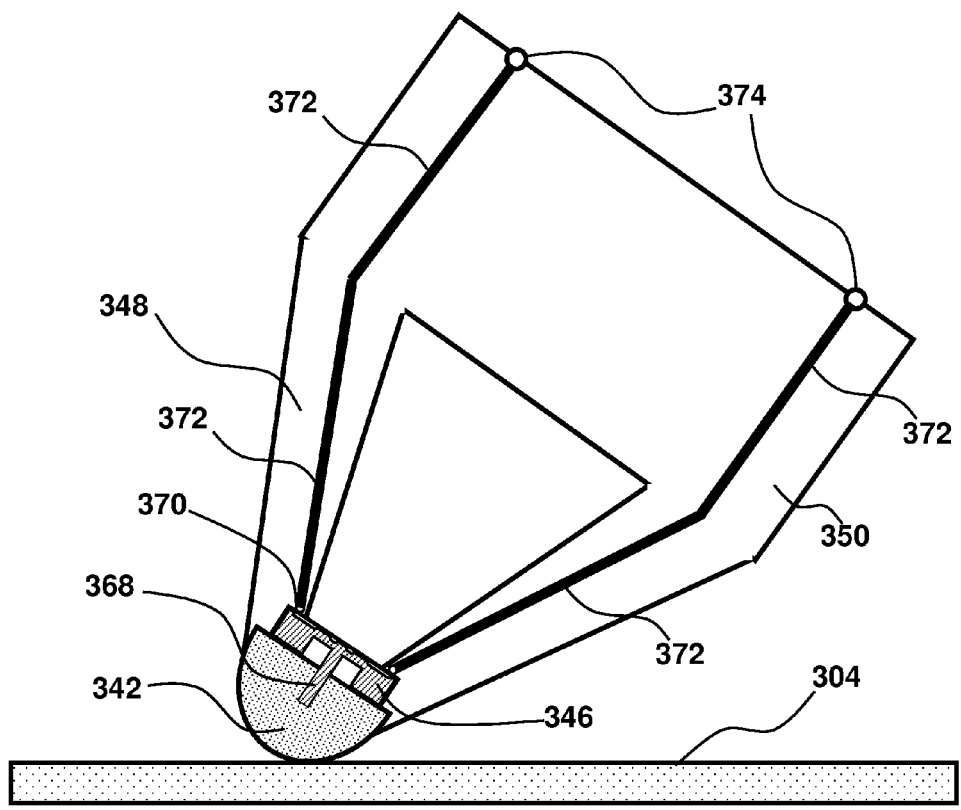
FIG. 13 illustrates 3D force sensor within an end-point of an interchangeable cartridge of the digital brush.

FIG. 13 illustrates an example of the interchangeable head 350 of the painting tool. The head comprises an end-point 342 fixed in the conical part 348 of the body of the head 350. The force sensor die 346 is attached to the end-point by the force-transferring element 368. The contact pads 370 of the die 346 are electrically connected by the wires 372 with the external electrical contacts 374, which provide electrical connection of the force sensor with the main processing electronic circuit located within non-interchangeable part of the painting tool.

The method described above can be used for a method of converting 2D images into digital 3D images, said method comprising:

providing an electronic canvas (computer monitor, TV screen, projection screen, etc.);

providing a digitized 2D image (picture, photo, drawing, etc.)

providing means for 3D digital vision (shutter glasses, splitting canvas on two canvases and switching these canvases between left and right eye, etc.);

providing at least one at least two-axis input control device allowing selecting images and digital painting or drawing on the canvas;

providing additional at least one at least one-axis input control device for virtual changing the position of the canvas along the axis between the painter and the canvas;

selecting certain areas on the digital 2D image, which are supposedly closer to the viewer than the background of the image;

providing a description in digital format of selected areas;

selecting virtual position of the canvas, which supposedly corresponds to the spatial position of the selected areas in the third dimension between the viewer and the background;

pasting the selected areas onto the selected virtual position of the canvas, which will result in splitting the selected areas on two copies for the right eye and the left eye and shifting (offsetting) these two copies horizontally in opposite directions with respect to a central vertical line for each canvas on a distance corresponding chosen virtual position of the canvas;

selecting next areas on the image, which are supposedly closer to the viewer than the previously selected and shifted areas of the image;

providing a description in digital format of selected areas;

selecting next virtual position of the canvas, which supposedly corresponds to the spatial position of the selected next areas in the third dimension closer to the viewer;

pasting the selected next areas onto the selected next virtual position of the canvas, which will result in shifting these next areas horizontally in opposite directions with respect to a central vertical line for each canvas on a distance corresponding chosen next virtual position of the canvas;

selecting next areas on the image and pasting them on the virtual canvases closer and closer to the viewer as many times as needed until closest to the viewer areas would not be selected and pasted;

providing a description in a digital format of a composed right and left images;

using left and right images for presentation of corresponding 3D images by available means for 3D vision.

The sequence of selecting and pasting areas from the image can be realized in an opposite order, namely from the foreground toward the background or in arbitrary order.

The areas between the two overlapping consecutively selected areas are gradually shifted horizontally such that pixels closer to the border of the first selected area are shifted to the same distance as the first area and that pixels closer to the border of the second selected area are shifted to the same distance as the second area while all the other pixels between the first and the second areas along the horizontal axis are shifted on different distances according to the predetermined law of the gradient of shift between the first and the second areas.

The gaps, which appeared between the two consecutively selected and shifted on different distance areas, can be filled in manually with at least one at least two-axis input control device allowing digital painting or drawing or selecting and stamping on the electronic canvas.

Obviously, the method of 3D painting can be used for editing, enhancing, filtering and modifying 3D photo images (3D photoshop), said method comprising:
  providing a 3D photo image;
  providing an electronic canvas (computer monitor, TV screen, projection screen, display of the mobile device, etc.);
  providing means for 3D digital vision (shutter glasses, splitting canvas on two canvases and switching these canvases between left and right eye, etc.);
  providing at least one at least two-axis input control device allowing digital painting, drawing or selection areas on the canvas;
  providing additional at least one at least one-axis input control device for virtual changing the position of the canvas along the axis between the painter and the canvas;
  choosing the virtual position of the canvas corresponding to the areas on the 3D photo image, which supposed to be edited, enhanced, filtered or modified;
  painting, drawing, editing, enhancing, filtering or modifying selected areas on the electronic canvas for each of the virtual positions of the canvas in the third dimension by changing this position with the at least one-axis input control device and verifying this position with the means for 3D digital vision;
  providing a description in digital format of images for right and left eyes on each virtual position of the canvas and of corresponding positions of the canvas;
  providing complete modified and edited 2D images of the 3D photo image for the right and the left eyes;
  using left and right images for presentation of edited 3D photo image by available means for 3D vision.

Figure 14:
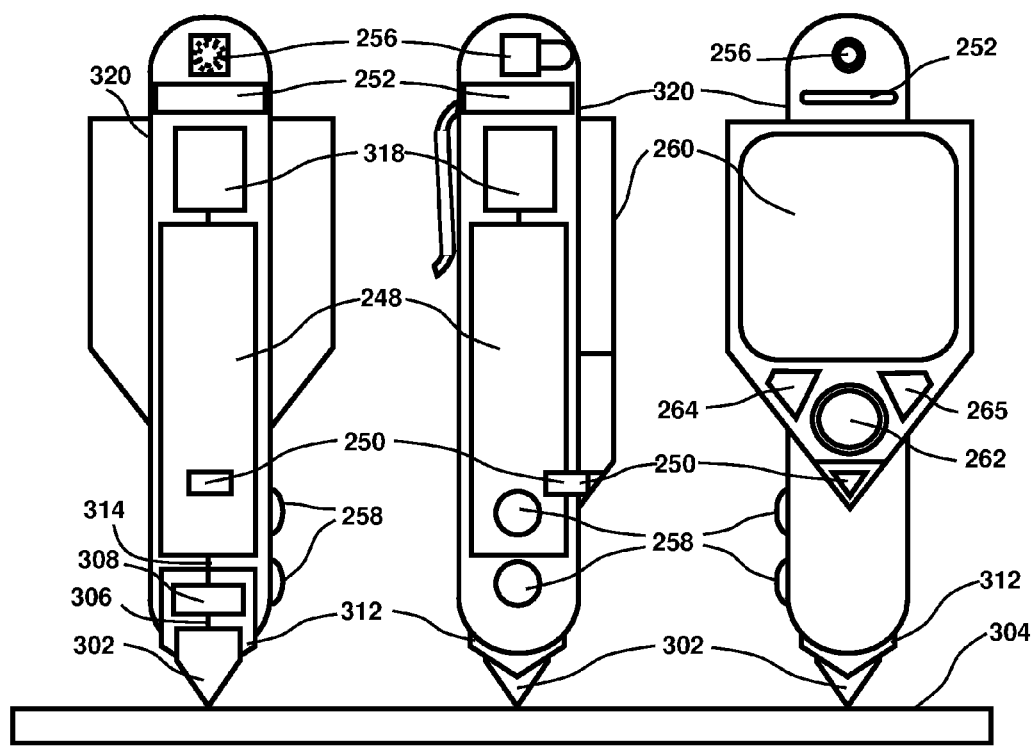
FIG. 14 shows a concept of a smart phone combining a digital brush and pen as a universal input control device, as pointing/navigating, hand-written text messaging and drawing messaging.
Figure 15:
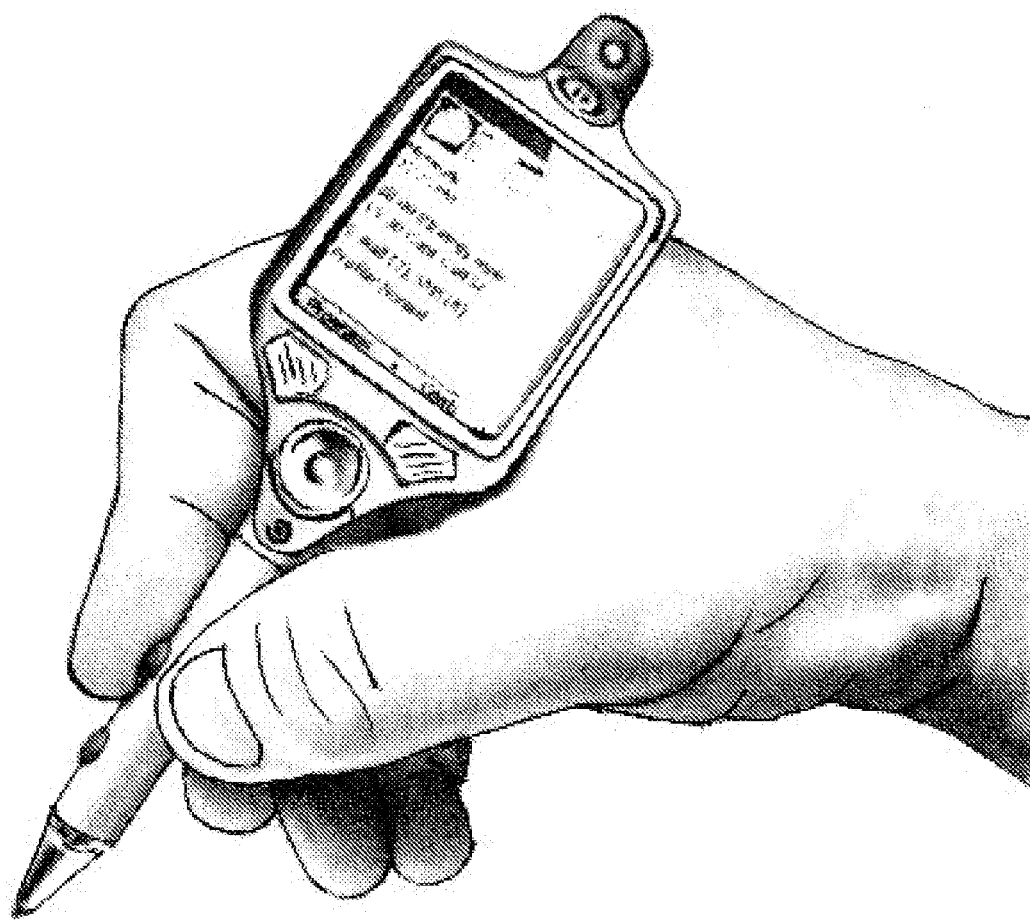
FIG. 15 shows a picture of a new concept of a smart phone with digital brush and pen.

FIGS. 14 and 15 illustrate an example of universal tool, which can be used for multiple applications. It can be used as a painting or drawing tool, as a pen or pencil for writing, as a mouse or joystick for navigation on the screen or computer or mobile gaming. It can have a wireless capability and can be combined with cell-phone capabilities with all the attributes, which smart phone has: display, camera, microphone, speakerphone, control buttons, etc.

As follows from FIG. 14, which depicts the front, side and back projections of the device, it has an end-point 302 coupled to the multi-axis force sensor 308 within an interchangeable cartridge 312. The tool has an electronic block 248, which comprise digital processor, wireless communication circuits, additional sensors, etc. For example, microphone 250 can be part of the block 248. Inside the body 320 of the device a power supply 318, speakerphone 252 and photo-camera 256 can also be located. A part of the body 320 is a display 260. A number of control buttons 258, 262, 264, 265 can be situated in convenient locations on the body 320 of the tool. Different functions, as described above, can be assigned to these control buttons. Each of these buttons can be multi-axis micro-joysticks significantly increasing the total number of functions under control.

It should be understood that the microstructures of the die, structures of the finger-mice, finger buttons and micro-joysticks and methods of their fabrication do not limit the present invention, but only illustrate some of the various technical solutions covered by this invention. While the invention has been described in detail with reference to preferred embodiments, it is understood that variations and modifications thereof may be made without departing from the true spirit and scope of the invention.

Therefore, while the invention has been described with respect to a limited number of the embodiments, those skilled in the art, having benefits of this invention, will appreciate that other embodiments can be devised which do not depart from the scope of the invention as disclosed herein. Other aspects of the invention will be apparent from the following description and the appended claims.

What is claimed is:

1. A method of digital recording of 3D hand-painted and 3D hand-drawn images, said method comprising:
  providing a digital electronic canvas for presenting two pictures for right and left eye for painting or drawing in 3D virtual space;
  providing means for 3D digital vision (shutter glasses, polaroid glasses, splitting canvas on two canvases for the right and left eye and switching these two canvases between the left and the right eye, or projecting both pictures for the right and the left eye on the same digital electronic canvas) wherein instant positions of digital electronic canvas in 3D virtual space are displayed;
  providing at least one hand-held three-axis input control device comprising a digital brush or digital pencil allowing digital painting or drawing on the digital electronic canvas;
  painting or drawing on the digital electronic canvas and verifying a position of the digital brush or digital pencil within 3D virtual space with the means for 3D digital vision;
  providing a description in digital format of images for the right and the left eyes for every and all instant virtual positions of the digital electronic canvas and of corresponding positions of the digital electronic canvas;
  providing complete 2D images of a painting for the right and the left eyes at any stage of painting;
  using left and right images of the painting for presentation of 3D painting by available means for 3D vision,
  wherein two inputs of at least one hand-held three-axis input control device comprising a digital brush or pencil are used for painting of lines or strokes along two orthogonal axes X and Y in a plane of the digital electronic canvas and the third input is used for painting or drawing the lines or strokes along Z axis between a painter and the digital electronic canvas by changing a distance between the painter and a virtual position of the digital electronic canvas along the Z axis allowing making 3D paintings (drawings) equally continuous in (XY) plane and (XZ) and (YZ) virtual planes and
  wherein a motion of the at least one hand-held three-axis input control device for making lines or strokes is provided simultaneously and continuously in all 3D (three dimensions) by free one hand and/or finger movements.

2. A method according to claim 1, further providing a description in digital format of images corresponding each instant virtual position of the canvas and of corresponding positions of the digital electronic canvas and providing complete 3D digital image of the painting for different applications associated with 3D image processing.

3. A method according to claim 1, wherein painting or drawing on the digital electronic canvas for each of the instant virtual positions of the digital electronic canvas in the third dimension will result in simultaneous painting on two canvases by switching canvases between right and left eye with frequency equals a half of a frame refreshing frequency of the digital electronic canvas such that each hand-painted stroke or line would appear on both canvases simultaneously with certain horizontal offsets with respect to a central vertical line on a physical canvas (computer monitor or TV screen) for each virtual canvas position on a distance corresponding to chosen depth of the virtual position of the digital electronic canvas.

4. A method according to claim 1, wherein complete 2D images of the painting for the right and the left eyes are provided by accumulation of all lines and strokes for the right and the left eye separately at any stage of painting.

5. A method according to claim 1, further providing an additional one or more at least one-axis input control device for controlling different functions necessary for a digital 3D painting process, said different functions being selected from a group of functions consisting of turning on and off, navigation of a cursor on a display of an electronic device, scrolling, zooming, shadowing, screening, selecting, deleting, restoring, saving, opening, closing, searching, setting up, previewing, undoing, clearing, repeating, pasting, finding, replacing, inserting, formatting, color selection, color mixing, selection of line or stroke width, selection of brush size, selection of swatch size, selection of sponge size, selection of eraser size, selection of a virtual position of the canvas, selection of a depth of focal plane around the canvas' virtual position, and selection of special effects.

6. A method according to claim 5, wherein different functions necessary for controlling digital 3D painting process are assigned to different inputs of different input control devices depending on the preferences of a painter and specifics of a required painting task.

7. A method according to claim 1, wherein a virtual instant current position of the canvas is presented by at least one virtual Z-axis having an origin located in a plane parallel to the canvas and having a scale describing a relative distance between the painter and the virtual position of the canvas and each virtual instant current position of the canvas is indicated on a scale of the at least one virtual Z-axis.

8. A method according to claim 7, wherein the virtual instant current position of the canvas is presented by more than one virtual Z-axis, which have different scale on different virtual Z-axes reflecting a different angular position of the virtual canvas with respect to different virtual Z-axes.

9. A method according to claim 8, wherein the virtual instant current position of the canvas is presented as a temporary plane within a 3D grid created by a system of lines including lines connecting points on different virtual Z-axes corresponding to the same position of the virtual canvas.

10. A system for digital recording of 3D hand-painted and 3D hand-drawn images, said system comprising:
   a digital electronic canvas for presenting two pictures for right and left eye for painting or drawing in 3D virtual space;
   means for 3D digital vision (shutter glasses, polaroid glasses, splitting canvas on two canvases for right and left eye and switching these two canvases between left and right eye, or projecting both pictures for right and left eye on the same digital electronic canvas) wherein instant positions of virtual canvas in 3D virtual space are displayed;
   at least one hand-held three-axis input control device comprising a digital brush or digital pencil allowing digital painting or drawing on the digital electronic canvas;
   means for 3D image presentation;
   wherein two inputs of at least one hand-held three-axis input control device are used for painting of lines or strokes along two orthogonal axes X and Y in a plane of the digital electronic canvas and the third input is used for painting or drawing the lines or strokes along Z axis between a painter and the digital electronic canvas by changing a distance between the painter and a virtual position of the digital electronic canvas along the Z axis allowing making 3D paintings (drawings) equally continuous in (XY) plane and (XZ) and (YZ) virtual planes; and
   wherein a motion of at least one hand-held three-axis input control device for making lines or strokes is provided simultaneously and continuously in all 3D (three dimensions) by free one hand and/or fingers movements; and
   wherein the system also provides a description in digital format of images for the right and the left eyes for every and all instant virtual position of the digital electronic canvas and of corresponding positions of the digital electronic canvas; and
   the system also provides complete 2D images of a painting for the right and the left eyes at any stage of painting as accumulation of all lines and strokes made up to that stage; and
   the system also provides complete 3D images of the painting by superposition of all layers corresponding to all virtual positions of the digital electronic canvas and the system provides, using 2D left and right images, ability for presentation of 3D painting.

11. A system according to claim 10, wherein an additional one or more at least one-axis input control device for controlling different functions necessary for a digital 3D painting is selected from a group of control devices consisting of: a scroll wheel, a sensitive pad, a mouse, a track ball, a joystick, a finger joystick, a key-button, a touch pad, a touch screen, and a motion sensor.

12. A system according to claim 10, wherein means for presentation of 3D images include: optical projection of two images with polarized light onto one screen and using polarized glasses, optical projection of two images with colored light onto one screen and using corresponding colored glasses, stereoscopic glasses and two photographs or slides, 3D digital personal viewer, shutter glasses and synchronous switching display between left and right eye, polaroid glasses and switching display between left and right eye polarized images, 3D monitor with a system of vertical cylindrical lenses and corresponding striped overlapping images for the right and left eyes, and direct projection of left and right images onto retina of the eyes.

13. A system according to claim 12, wherein the 3D digital personal viewer comprises:
   two micro-displays for left and right eye;
   two lenses of glasses for projecting images from the micro-displays into eyes;
   processor;
   memory;

power supply;

transceiver; and body of the 3D digital personal viewer integrating all elements of the viewer.

14. A system according to claim 10, wherein the at least one hand-held three-axis input control device allowing digital painting or drawing on the canvas comprises:

an end-point coupled to an integrated at least one three-axis force sensor within the at least one input control device;

integrated circuit (IC) for digitizing information from at least one three-axis force sensor and processing data related to a change of force vector components;

hardware and software for providing a description in digital format of how the input control device has been moved over a working surface based at least in part on the correlation between the force vector components and corresponding movement vector components; and hardware and software for providing a description in digital format of how the input control device has been pressed to the working surface based at least in part on a force applied by the end-point to the working surface, wherein the input control device is moving with a hand and/or fingers such that the end-point is contacting the working surface suitable for such movement across the working surface in a process of painting, drawing, writing or cursor navigating while recording with the integrated at least one three-axis force sensor a change of X and Y force vector components representing a motion of the at least one input control device in XY plane and a change of Z force vector component applied to the at least one three-axis force sensor by the end-point representing a virtual motion of the input control device in Z direction.

15. A system according to claim 14, further comprising at least one sensor chosen from the group of sensors consisting of: one-axis linear accelerometer, two-axis linear accelerometer, three-axis linear accelerometer, one-axis gyro, two-axis gyro, three-axis gyro, one-axis angular accelerometer, two-axis angular accelerometer, three-axis angular accelerometer, one-axis compass, two-axis compass, three-axis compass for determining motion parameters, at which the device has been moved between recording of two positions on the working surface.

16. A system according to claim 11, wherein the at least one hand-held three-axis input control device allowing digital painting or drawing on the canvas comprises:

a device having an end-point coupled to an integrated at least one three-axis force sensor within the device;

at least one at least two-axis motion sensor within the device;

any working surface suitable for moving the device having an end-point across the working surface in a process of painting or drawing;

IC (integrated circuit) for digitizing an information from at least one three-axis force sensor and from at least one at least two-axis motion sensor and processing data related to change of force vector components and motion vector components;

hardware and software for providing a description in digital format of how the device has been pressed to the working surface based at least in part on a vector force externally applied by the end-point to the working surface; and hardware and software for providing a description in digital format of how the device has been moved over the working surface based at least in part on a correlation between force vector components and corresponding motion vector components, wherein the device is moving with a hand and/or fingers such that the end-point is contacting a surface suitable for such movement across the working surface in a process of painting, drawing, writing or cursor navigating while recording with the integrated at least one three-axis force sensor a change of a vector of force applied to the at least one three-axis force sensor by the end-point and recording with at least one at least two-axis motion sensor a change of a vector of motion representing together with three-axis force sensor an entire motion of the device in all three dimensions.

17. A system according to claim 16, wherein the at least one three-axis force sensor comprises of: a semiconductor substrate sensor chip, said semiconductor substrate sensor chip comprising a frame element, a rigid island element and an elastic element mechanically coupling said frame element and said rigid island elements; a set of three or more stress-sensitive IC components integrated into the elastic element; at least one force-transferring element coupling the end-point to a rigid island element of a sensor die for transferring the applied external vector force from the end-point through at least one force-transferring element to the rigid island element of the sensor die, and thereby generating electrical outputs from application an external force vector via stress-sensitive IC components positioned in the elastic element, wherein each stress-sensitive IC component is carrying a unique orthogonal system components of signal from the external force vector, and the IC component outputs are functions of input component stresses developed from an orthogonal system of external force vector components.

18. A system according to claim 16, wherein the at least one at least two-axis motion sensor is chosen from a group: linear acceleration sensor, angular acceleration sensor, angular rate sensor or combination of any above by measured parameter and/or number of axes.

19. A system according to claim 10, further comprising an additional one or more at least one-axis input control device for controlling different functions necessary for a digital 3D painting process, which include turning on and off, navigation of a cursor on a display of an electronic device, scrolling, zooming, rotation, shadowing, screening, selecting, deleting, restoring, saving, opening, closing, searching, setting up, previewing, undoing, clearing, repeating, pasting, finding, replacing, inserting, formatting, color selection, color mixing, selecting a line or stroke width, brush size, swatch size, sponge size, eraser size, a virtual position of the canvas, a depth of a focal plane around the canvas' virtual position, and special effects.

* * * * *

UNITED STATES PATENT AND TRADEMARK OFFICE
CERTIFICATE OF CORRECTION

PATENT NO. : 8,817,017 B2  Page 1 of 1
APPLICATION NO. : 13/116015
DATED : August 26, 2014
INVENTOR(S) : Vaganov It is certified that error appears in the above-identified patent and that said Letters Patent is hereby corrected as shown below:

In the CLAIMS:
Claim 17, column 20, line 26, delete "elements" and insert --element--.

Signed and Sealed this
Seventeenth Day of February, 2015

Michelle K. Lee
*Deputy Director of the United States Patent and Trademark Office*